(No Model.) 9 Sheets—Sheet 1.

P. JORDAN & J. G. HODGSON.
CAN BODY MAKING MACHINE.

No. 436,791. Patented Sept. 23, 1890.

Witnesses:
Mack A. Claflin.
Geo. C. Curtis.

Inventors:
Peter Jordan
John G. Hodgson
By Munday, Evarts & Adcock
their Attorneys.

(No Model.) 9 Sheets—Sheet 3.

P. JORDAN & J. G. HODGSON.
CAN BODY MAKING MACHINE.

No. 436,791. Patented Sept. 23, 1890.

Witnesses:
Mack A. Claflin
Lew. E. Curtis

Inventors:
Peter Jordan
John G. Hodgson
By Munday, Evarts & Adcock
their Attorneys (No Model.) 9 Sheets—Sheet 4.

P. JORDAN & J. G. HODGSON.
CAN BODY MAKING MACHINE.

No. 436,791. Patented Sept. 23, 1890.

Witnesses:
Mack A. Claflin.
Lew. E. Curtis.

Inventors:
Peter Jordan
John G. Hodgson
By Munday, Evarts & Adcock
their Attorneys.

(No Model.)  9 Sheets—Sheet 6.

P. JORDAN & J. G. HODGSON.
CAN BODY MAKING MACHINE.

No. 436,791. Patented Sept. 23, 1890.

Witnesses:

Inventors:
Peter Jordan
John G. Hodgson
By Munday, Evarts & Adcock
their Attorneys (No Model.)

P. JORDAN & J. G. HODGSON.
CAN BODY MAKING MACHINE.

No. 436,791.

Patented Sept. 23, 1890.

Witnesses:
Mack A. Claflin
Lew. E. Curtis

Inventors:
Peter Jordan
John G. Hodgson
By Munday, Evarts & Adcock
their Attorneys (No Model.) 9 Sheets—Sheet 8.

P. JORDAN & J. G. HODGSON.
CAN BODY MAKING MACHINE.

No. 436,791. Patented Sept. 23, 1890.

Witnesses:
Mack A. Claflin.
Lew. E. Curtis.

Inventors:
Peter Jordan
John G. Hodgson
By Munday, Evarts and Adcock
their Attorneys.

THE NORRIS PETERS CO., PHOTO-LITHO., WASHINGTON, D. C.

(No Model.) 9 Sheets—Sheet 9.

P. JORDAN & J. G. HODGSON.
CAN BODY MAKING MACHINE.

No. 436,791. Patented Sept. 23, 1890.

Witnesses:
Mack A. Claflin.
Geo. E. Curtis

Inventors
Peter Jordan
John G. Hodgson
By Munday, Evarts & Adcock
their Attorneys.

UNITED STATES PATENT OFFICE.

PETER JORDAN AND JOHN G. HODGSON, OF MAYWOOD, ILLINOIS, ASSIGNORS TO EDWIN NORTON, OF SAME PLACE, AND OLIVER W. NORTON, OF CHICAGO, ILLINOIS.

CAN-BODY-MAKING MACHINE.

SPECIFICATION forming part of Letters Patent No. 436,791, dated September 23, 1890.

Application filed March 22, 1889. Serial No. 304,235. (No model.)

*To all whom it may concern:*

Be it known that we, PETER JORDAN and JOHN G. HODGSON, citizens of the United States, residing in Maywood, in the county of Cook and State of Illinois, have invented a new and useful Improvement in Can-Body-Making Machines, of which the following is a specification.

Our invention relates to machines for making can-bodies.

It consists in the novel devices and novel combinations of parts and devices herein shown and described, and more particularly pointed out in the claims.

In the accompanying drawings, which form a part of this specification, and in which similar letters of reference indicate like parts.

In our invention the blank $x$ is first automatically fed from a pile or stack of blanks X to a suitable edge-folding mechanism or device, which forms the first hook $x'$ upon one end or side of the sheet. The blank is next automatically fed or conveyed to the edge-folding mechanism or device, which forms the second hook or fold $x^2$ upon its opposite end or side. This second-edge-folding device is preferably mounted in or upon the horn, around and upon which the can-body is formed, so that this second-edge-folding mechanism, which grasps the blank to make the second hook $x^2$, may be utilized or serve also as the means for clamping the blank to the horn. The blank is next, by the rotation of the horn, wrapped around the horn and the first hook or fold imposed or hooked over the second one, interlocking the two together. The next operation is to bump, squeeze, or compress the interlocked hooks or folds against the horn, and then the can-body or can-bodies are extracted or pushed off the horn by a suitable extractor device.

In order to form two can-bodies at a time by the same mechanism, the first-edge-folding device, as well as the second-edge-folding device, and horn are made long enough to operate upon two blanks at a time, separate guides, passages, or chutes being provided for the two separate blanks.

To enable the machine to operate upon four can-body blanks at a time, the edge-folding devices and bumping or squeezing device are duplicated at the opposite end of the horn.

In the drawings, A represents the frame of the machine. This may be of any suitable construction to give support or bearing to the several operative devices or parts of the machine.

Figures 5, 6:
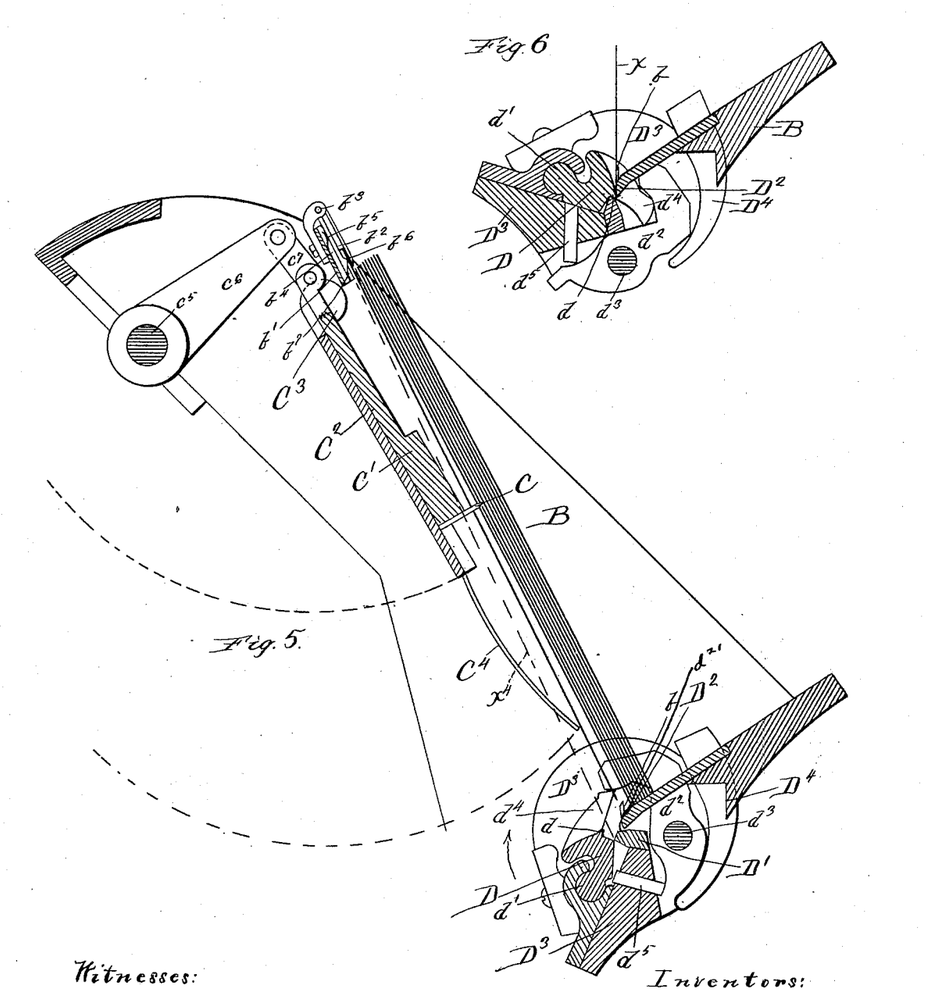
Fig. 5 is an enlarged detail vertical sectional view showing the blank-holder, blank-feed mechanism, and mechanism for forming the first fold or hook on the forward end of the blank.
Fig. 6 shows the hook forming or folding mechanism of Fig. 5 in a different position.
Figure 7:
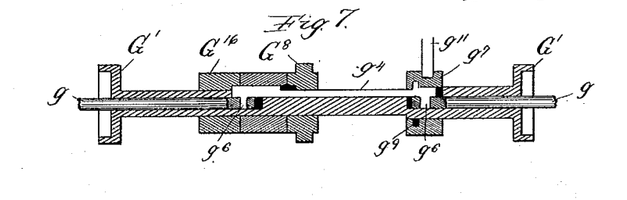
Fig. 7 is a longitudinal section of the horn-shaft.
Figure 8:
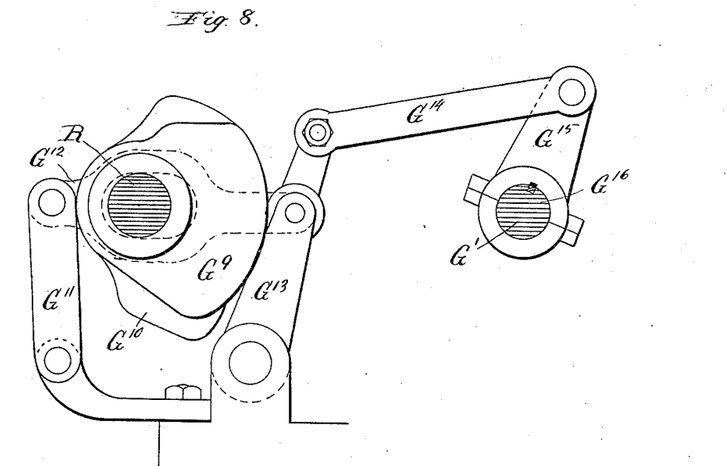
Figs. 8 and 9 are enlarged detail cross-sectional views of the driving-shaft and horn-shaft, showing the mechanism for operating the horn-shaft.
Figure 9:
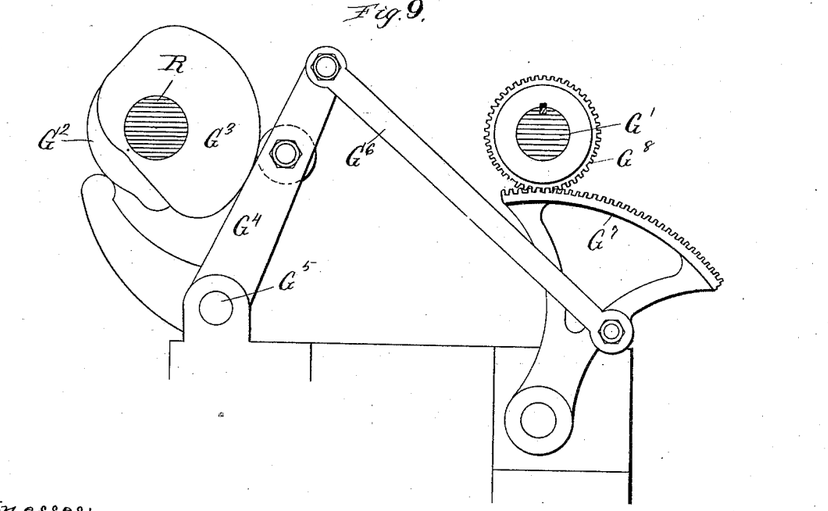

B is the blank-holder secured to the frame of the machine and by which the pile or stock of blanks X is supported. This can-bodyblank holder preferably consists of an inclined bottomless box having a projecting lip $b$ at its lower edge, upon which one end of a pile of blanks X rest, and a ledge $b'$, upon which the other end of the blanks rest. The blank-holder B is also preferably furnished with one or more, preferably two, slotted arms $b^2$, pivoted at $b^3$ to the frame and mounted in suitable slots $b^4$ in the ledge $b'$, and which are pressed up against the pile of blanks X at the end thereof by springs $b^5$. The slot $b^6$ in these arms $b^2$ is just wide enough to admit one sheet or blank, so that only the lowermost blank of the pile can be pushed endwise into this slot, so that its forward end will free the shoulder or projection $b$. This slotted arm $b^2$ is used as a safeguard to prevent possibility of feeding two or more blanks at a time from the pile. This slotted safeguard $b^2$ is preferably mounted in a pivotal or yielding manner to insure its being in proper position against the end of the pile of blanks. The forward end $b^7$ of the slotted safeguard or arm $b^2$ is made tapering, as indicated in Fig. 5, so that this tapering portion may project slightly under the pile of blanks, and thus better guide the lowermost blank into the slot $b^6$.

C is the automatic feed device by which the blanks are fed or delivered one by one from the pile X. This feed device C may be of any suitable construction adapted to feed the blanks one by one from the pile; but as sheets of tin vary somewhat in thickness the blank-feed device which we prefer to employ is one which we have specially devised for use in combination with the other operative parts of our machine. This preferred form of feed device consists in a pair of opposing blades C C, having knife-edges inclined to the plane of the sheet, so that when pressed up against the bottom of the pile of sheets the knife-edges of the blades C C will only engage the opposite edges of the lowermost sheet. The feeder of course preferably consists of two opposing blades; but if only one blade is employed it will sufficiently engage the lowermost sheet to pull it back over the ledge $b$. The feeder-blades C are secured to or made integral with the slide C', by which they are moved or reciprocated sufficiently to pull or push the lowermost blank over the ledge $b$ and permit its forward edge or end to move down between the edge-folding device D and the dies or jaws D' D$^2$, which oppose the hook-forming or edge-folding device D.

The feeder-slide C' reciprocates on a swinging arm or frame C$^2$, which is pivoted to the frame at C$^3$, in order that it may swing out of the way of the blank, and thus permit the rear end of the blank to swing down into position to be received by the second edge-folding or hook-forming device F, which is carried by the horn G. The swinging or pivotal movement of the blank about the edge-folding or hook-forming device D thus reverses or turns the blank end for end before it is delivered to the second-hook-forming device F.

E is a guide, passage, or chute for the blank, extending between the hook-forming devices D and F.

The pivotal arm C$^2$ is furnished with an extension C$^4$, extending down near the end of the blank, to support the blank and prevent it from bending.

After the feed device C moves backward to push the lowermost blank back sufficiently to permit its lower or forward end to drop over the supporting-ledge $b$ of the blank-holder the pivoted arm or frame C$^2$ is caused to swing down slightly to release the pressure of the feeder-blades C C against the pile of blanks, and thus permit the now freed lowermost blank to slip down by its own gravity to the hook-former or edge-folder D. We prefer to so arrange the blank-holder B and feed device F, as well as the blank-passage way E, on an incline to the horizontal that the gravity of the blanks may be utilized to cause the blanks to move forward to the hook-formers or edge-folders D and F. It is obvious, however, that they may be differently arranged, and suitable means other than the gravity of the blanks employed to push the blanks forward to the edge-folders D and F.

We prefer, in order to utilize the gravity of the blank for the purpose of reversing or turning the blank end for end about the first-hook former D as a pivot, to arrange the blank-holder B and the passage E at an angle to each other about as shown in the drawings; but our invention is not limited to this construction or arrangement, wherein the gravity of the blank is made to aid in reversing or turning the blank end for end.

Figure 10:
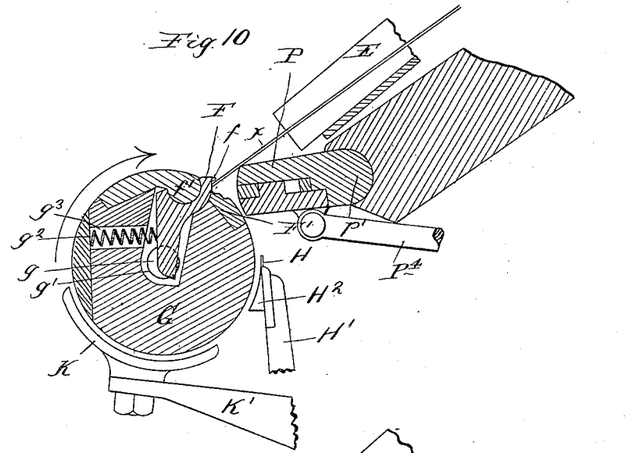
Figs. 10, 11, 12, and 13 are detail cross-sectional views of the horn, showing the mechanism in different positions as performing the successive operations upon the blank.
Figure 11:
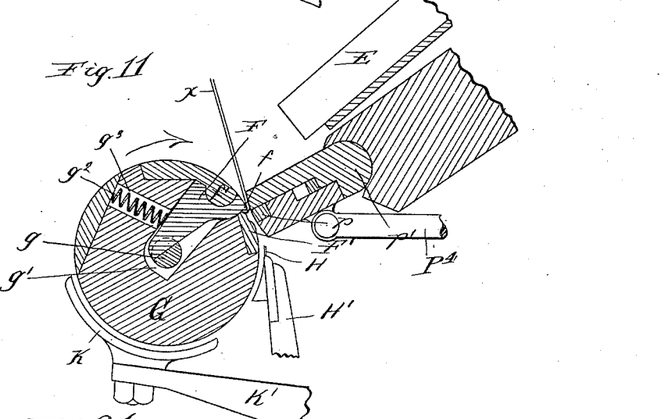

The hook-former or edge-folder D has a web or blade like projection $d$, over which the fold or hook $x'$ is formed. The former D is pivoted at $d'$ to a rotary shaft or head D$^3$, journaled upon the frame of the machine. The die or jaw D' is secured rigidly to this rotary head, and the die or jaw D$^2$ is secured to the rigid frame-work of the machine. This die is preferably, in fact, made integral with the end piece of the blank-holder against which the forward end of the pile of blanks abut. The hook-former D is given a vibratory movement on its pivot $d'$ by means of a cam-shaped lever $d^2$, pivoted at $d^3$ to the rotary head D$^3$, and which engages a stationary cam D$^4$, secured to the frame of the machine. As the head D$^3$ rotates, the cam-lever $d^2$ engages a wing or arm $d^4$, secured rigidly to the former D, which gives the former D its closing movement against the opposing dies D' D$^2$, as clearly shown in Figs. 5 and 6. The former D is swung back or opened to release the hook $x'$, that has been formed, and to receive the succeeding blank by a pin $d^5$, mounted in a suitable slot or hole in the rotary head D$^3$, which pin is engaged by the cam-lever $d^2$. The simple rotary or oscillatory movement of the head D$^3$ thus forms the first hook or edge fold $x'$ upon the forward end of the blank $x$. In Fig. 5 the dotted line $x^4$ represents the blank $x$ after it has fed down against the rotary die D', which acts as a stop for the sheet. If the blank should drop down against and rest upon the side face $d^{21}$ of the die D, as may sometimes happen when the head $D^3$ rotates slightly from the position shown in Fig. 5 in the direction shown by the arrow, the blank $x^4$ will slip off the side face of the die D' and rest upon the end face of said die, as shown by the dotted line in Fig. 5. The movement of the former D on the head $D^3$, to which it is pivoted, will next clamp the end of the sheet or blank between the end face of the die D' and the adjacent face of the web or blade $d$. The farther rotation of the head $D^3$ into the position shown in Fig. 6 completes the hook by carrying the blank against the stationary die or jaw $D^2$. As shown on Fig. 6, the dies D' and $D^2$ constitute a female die, into which the edge of the sheet is pressed by the web or blade $d$ on the former D. The backward movement or rotation of the head $D^3$ now opens the former D and swings the blank $x$ down about the head $D^3$ as a pivot, so that the rear end of the blank will be fed foremost to the horn G and edge-folder F, carried thereby. The edge-folder F has a lip or blade $f$, which operates to clamp the edge of the sheet against the opposing die or jaw F', which is or should be correspondingly recessed. The former F is pivoted at $f'$ to the horn G, and it is operated by a sliding wedge or bar $g$, which, like the former F, is mounted in a suitable recess $g'$ in the horn G. The wedge $g$ operates to close the former F against the die F', and a spring $g^2$, mounted in a recess $g^3$ in the horn, serves to open the jaw when the wedge or rod $g$ is withdrawn. The horn G is mounted in suitable bearings G' on the frame of the machine, and is given a rotary movement in the direction indicated by the arrows in Figs. 10, 11, and 12, which rotary movement serves, after the end of the sheet is clamped between the former F and die F', to wrap the blank or sheet around the horn, and thus form or shape up the can-body. In Fig. 10 the blank $x$ is shown fed down in position for its end to be clamped between the now open former F and the die F'. In Fig. 11 the same parts are shown with the former F closed and clamping the edge of the blank between itself and die F'. The rotation of the horn G in the direction indicated by the arrows in Figs. 10 and 11 now wraps the blank around the horn and at the same time completes the formation of the second hook or edge fold $x^2$. The act of wrapping the sheet or blank around the horn folds the same over the lip $f$ of the former F. The guides or shoes $H^2$ K L, surrounding the horn, serve to hold and bend the blank around the horn as the horn is rotated, one edge of the blank being clamped between the dies. This function may also be in part performed by the presser P, as will be clearly understood from Figs. 10 and 11. The horn makes somewhat more than a complete revolution into the position shown in Fig. 12.

Figure 12:
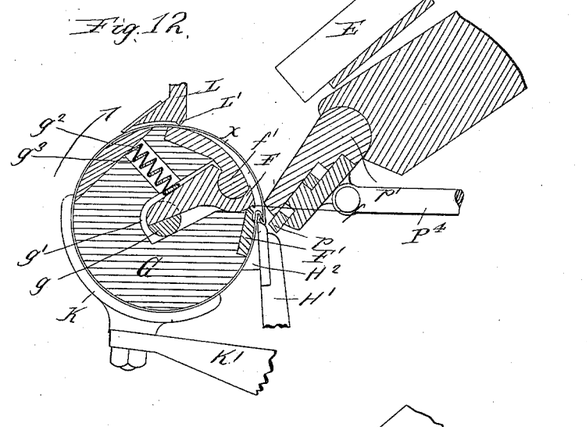

H is a stop-blade, which engages the first hook or edge fold $x'$ as the blank is being wrapped around the horn by the rotation thereof. This stop-blade is arranged near the periphery of the horn, so that it will surely engage the first hook or fold $x'$ and hold it in position for interlocking with the second hook or fold $x^2$ of the blank, as shown in Fig. 12. The stop-blade H is preferably mounted movably, so that it may be moved toward or from the horn, as desired. We prefer to mount this stop-blade on an arm or lever H', pivoted at $h$ to the frame of the machine, so that it may be swung to or from the horn. The arm H' also preferably carries a curved shoe or presser device $H^2$, which may be made integral with the stop-blade H or the pivoted arm H'. The arc of this shoe should correspond with that of the horn. The purpose of this shoe is to press the inner end of the blank $x$, which carries the first and now outwardly-projecting hook $x'$, flat against the horn during the operation of interlocking the second and inwardly-projecting hook $x^2$ with the first hook $x'$, said second hook $x^2$ hooking over the first hook $x'$, as is clearly indicated in Fig. 12.

The horn G, being a solid one, as contradistinguished from an expansible or compressible one, is made smaller than the finished can-body, so as to permit the overlapping of the hook $x^2$ over the hook $x'$.

Figure 4:
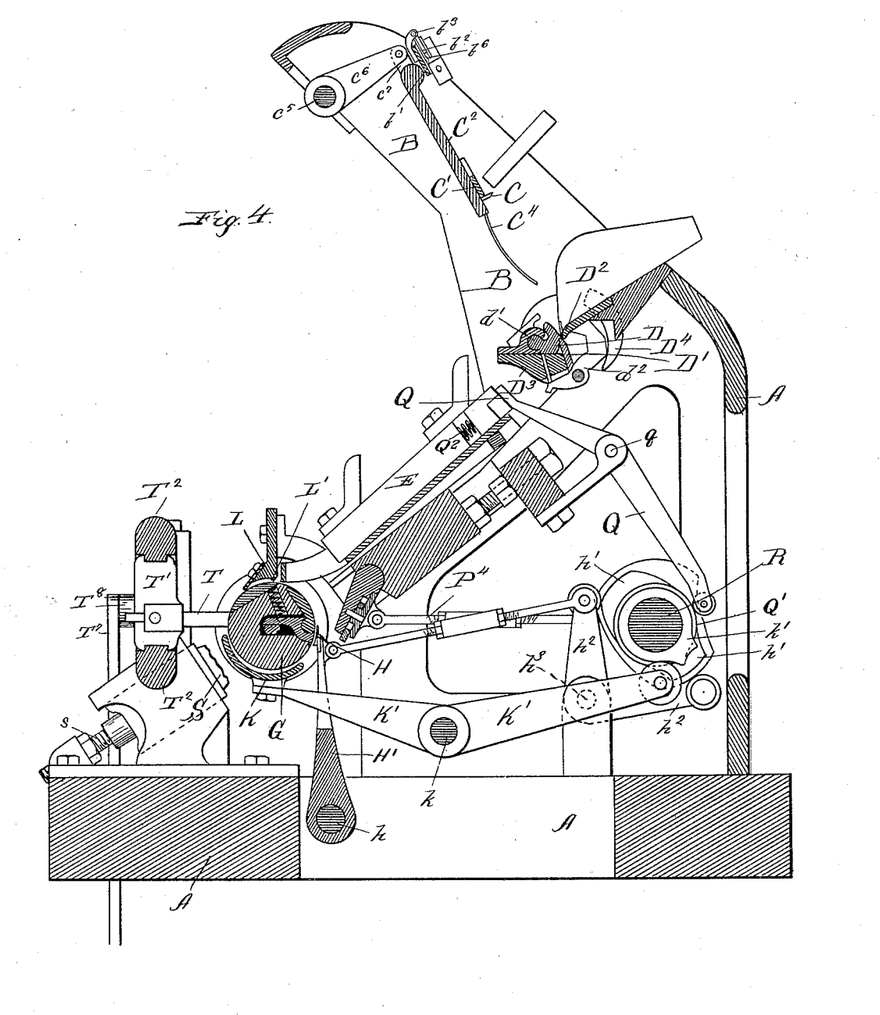
Fig. 4 is an enlarged section on line 4 4 of Fig. 1.
Figure 13:
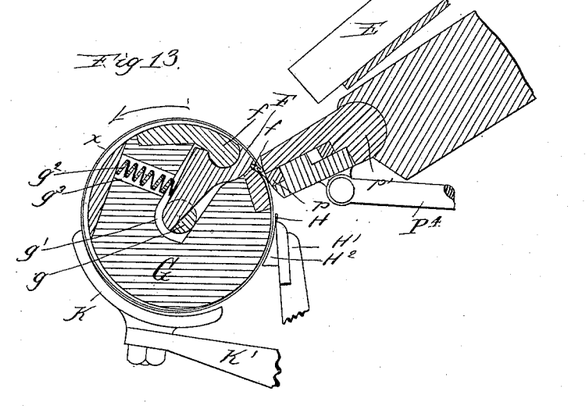
Figure 14:
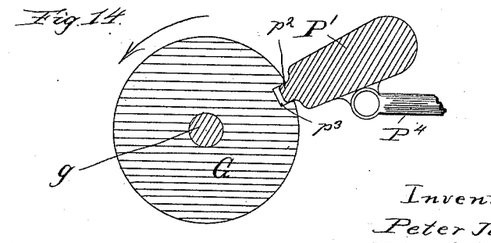
Fig. 14 is a cross-section of the horn on line 14 14 of Fig. 2 and showing the mechanism for operating the bumper or seam-squeezing device.
Figures 15, 16:
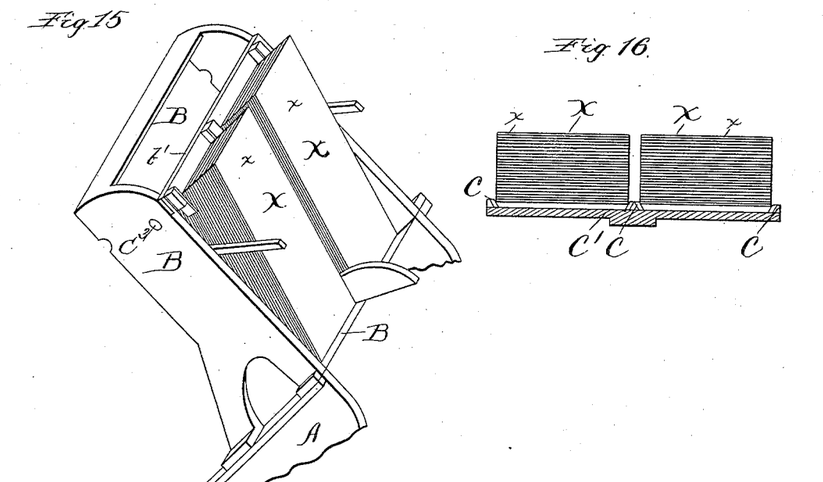
Fig. 15 is a detail perspective view of the blank-holder.
Fig. 16 is a detail sectional view of the blank-feed device.
Figure 17:
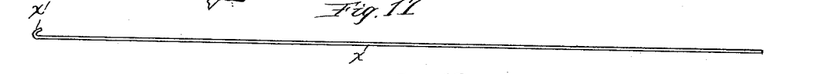
Figs. 17, 18, 19, and 20 show the sheet or blank in successive stages or steps of operation performed upon it by the machine, Fig. 17 showing the blank with the first hook or fold formed upon one end, Fig. 18 showing the blank with the second hook or fold formed upon its opposite end, Fig. 19 showing the blank formed or curved into cylindrical shape and the two hooks interlocked, and Fig. 20 showing the interlocked hooks pressed or squeezed into the seam.
Figure 18:
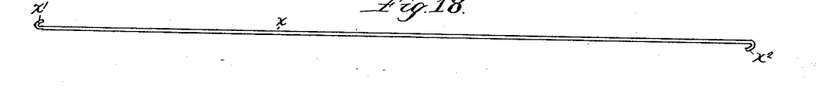
Figure 19:
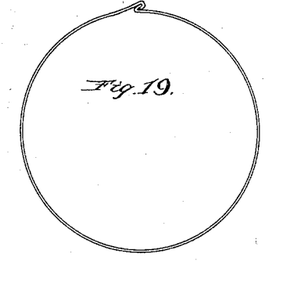
Figure 20:
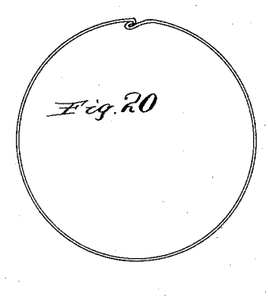
Figure 21:
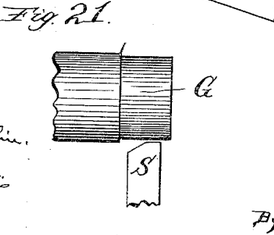
Fig. 21 is a detail view of the horn-support.

To insure the overlapping and interlocking of the hooks $x^2$ $x'$, a second guide-shoe K is provided, which, like the shoe $H^2$, is preferably made movable, so that it may operate to press the blank $x$ more snugly against the periphery of the horn and cause the lap or excess portion of the can-body to continue around the horn to the part where it is needed to permit or cause the hooks $x^2$ to overlap or hook over the hook $x'$, as is indicated in Fig. 12. This guide-shoe K is preferably mounted upon or secured to the end of a lever K', pivoted at $k$ to the frame of the machine. A third guide-shoe L is located farther around the horn, the same being preferably secured rigidly to the frame of the machine. This third guide-shoe is designed simply to preserve the cylindrical shape of the can-body after the former F opens and releases the hook $x^2$ preparatory to the interlocking or overlapping of the hooks $x^2$ $x'$. It fits the horn somewhat loosely, and is provided with a cam-like projection L', which serves to keep the blank close to the horn. This will be clearly understood from Figs. 4 and 12. After the horn G revolves around nearly to the position indicated in Fig. 12 the former F is opened, thus releasing the hook $x^2$, and the movable guide-shoes $H^2$ and K being then pressed up against the horn the hook $x^2$ is lapped over or carried beyond the hook $x'$, and while the blank and horn are in this position the bumper or seam-squeezing device P, which carries a movable blade or projection $p$, moves or swings up into the position indicated in Fig. 12 and crowds or pushes the fold or hook $x^2$ into the hook $x'$. This is clearly indicated in Fig. 12. The horn G now rotates backward to the position indicated in Fig. 13, thus bumping or squeezing the interlocked folds or hooks $x'$ $x^2$ into a solid seam.

The movable blade or projection $p$ slides on the bumper P, so that its face shuts in flush with the operative face of the bumper. The seam squeezer or bumper P is preferably pivoted to the frame at $p'$, and it is furnished with an operating-arm $P^4$, actuated in any suitable manner. The blade $p$ of the presser P is mounted in a suitable slot or way in the presser P, the blade itself being also slotted to limit its outward movement, as is clearly shown in Figs. 12 and 13. The blade moves outward by its own gravity, and is pushed back by contact with the horn. It may, however, be moved by any suitable means.

The passage or chute E, as shown in the drawings, is sufficiently inclined to permit or cause the blanks to slide down to the former F and horn G by their own gravity; but we prefer to provide a positive device for moving the sheets along this passage E to the former F. This feed-pusher device may preferably consist of a simple feed-lever Q, pivoted at $q$ to the frame and actuated by any suitable means.

To properly support the horn against the thrust of the plunger or squeezer during the squeezing operation, we provide at each end of the horn a support S, which is preferably secured at $s$ on the frame of the machine diametrically opposite the pivot $p'$ of the plunger P. This horn-support S is made slightly tapering to permit the can-bodies to enter between the horn and support, and it is located the full thickness of the blank away from the horn to permit the free extraction of the can-body after the seam is closed. The slight spring of the horn brings it against the support to resist the thrust of the squeezing mechanism. By the backward rotation of the horn before referred to a tooth or projection $p^2$ on the operating-arm $P'$ of the seam-squeezer P engages a similar groove or recess $p^3$ in the horn G, and thus insures the opposing action of the support S to the thrust or pressure of the squeezer P.

T is the extractor or device which pushes the finished can-bodies from the horn. It, or the slide T', to which it is attached, reciprocates in suitable guides $T^2$ on the frame of the machine.

The blank-holder B, the feed device C, and the chute or passage E are duplicated on each side of the machine, there being four of each in the machine shown in the drawings, these parts being separate for each can-body blank; but the edge-folders for hook-formers D and F, horn G, stop-blade H, guide-shoes $H^2$, K, and L, bumper or squeezer P, blank-pusher Q, and extractor T are combined and arranged to operate upon two can-bodies or can-body blanks at a time, the edge-folders, &c., being simply made long enough to operate upon two can-bodies instead of one. It will thus be seen that by a very slight additional expense in the construction of our improved machine it may be made to make two can-bodies at a time on each side. It should also be understood that the edge-folders E and F and other parts may operate upon three or more adjacent blanks or can-bodies at a time, instead of two, as shown in the drawings.

We have now described one end or half of the machine, which serves to make two bodies at a time, and as the other end or half of the machine is an exact duplicate of the end or half already described it is of course not necessary to duplicate the description.

Figure 1:
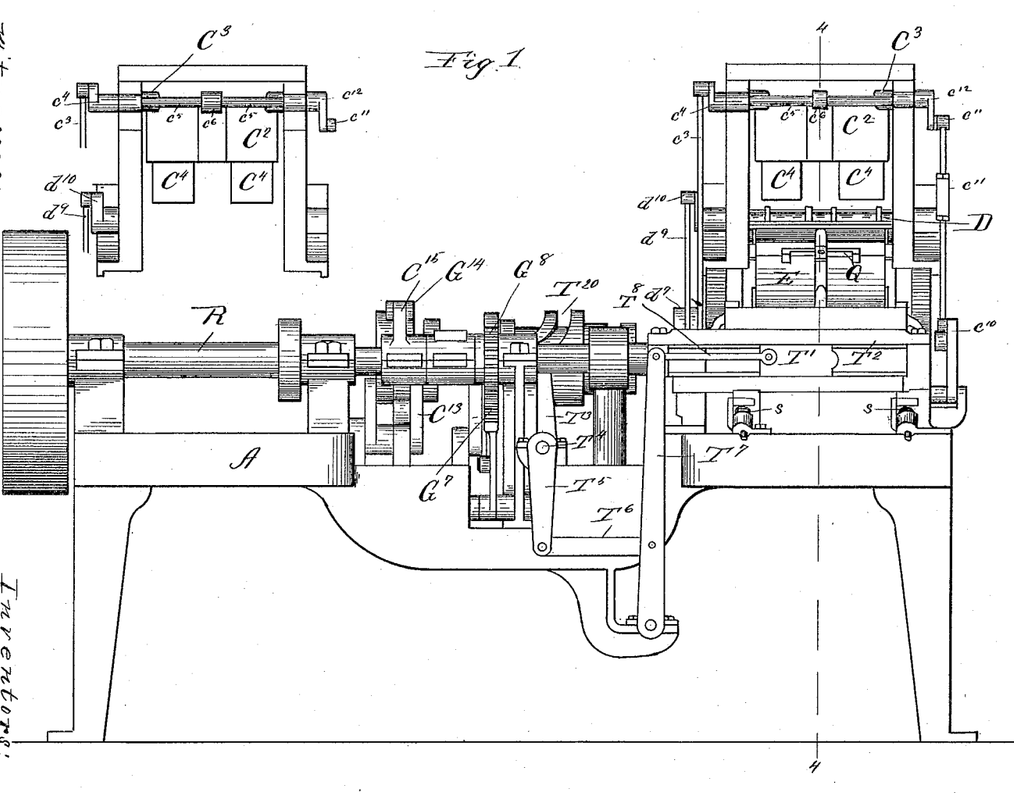
Figure 1 is a side elevation of a machine embodying our invention.
Figure 2:
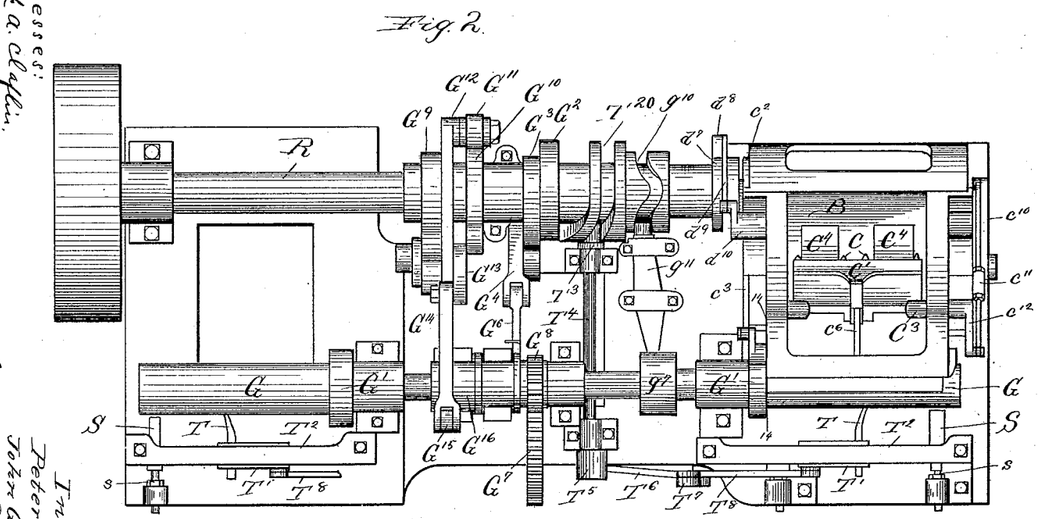
Fig. 2 is a plan view.
Figures 3, 22, 23, 24:
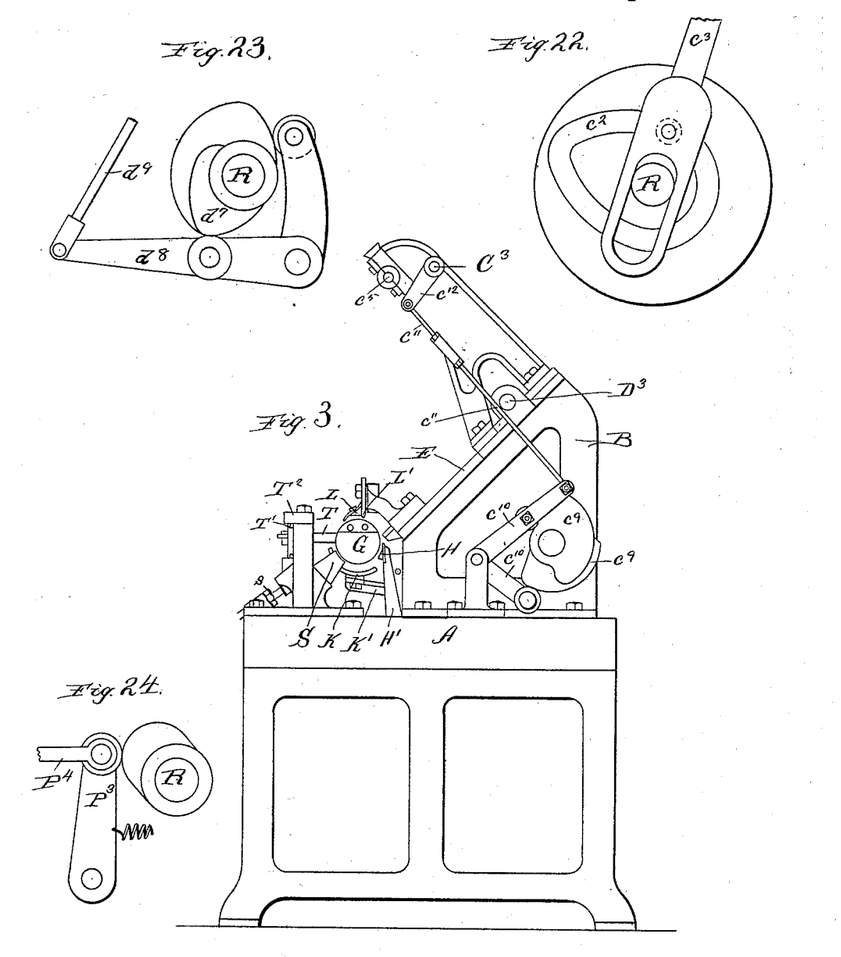
Fig. 3 is an end view.
Figs. 22, 23, and 24 are detail views of cams for operating certain points described.

In Fig. 1 of the drawings the duplicate mechanism at the left hand of the machine is indicated, some of the parts, however, being omitted or broken away to better show parts that would otherwise be concealed.

The feed-slide C', which carries the feed device C is reciprocated on the swinging guide-arm $C^2$ by means of a cam $c^2$ on the main driving-shaft R, through a link $c^3$, connected with the arm $c^4$ of a rock-shaft $c^5$, having an arm $c^6$, connected by a link $c^7$ with the feeder-slide C'. The swinging guide-arm $C^2$ is rotated or swung about its pivot $C^3$ by means of a cam $c^9$ on the main driving-shaft R through a lever $c^{10}$, link $c^{11}$, connected to the crank-arm $c^{12}$, secured to the pivot or rock shaft $C^3$. The rotary head or shaft $D^3$, which carries the hook-former D and die D', is operated by means of a cam $d^7$ on the main driving-shaft R through the lever $d^8$, connecting-link $d^9$, and crank-arm $d^{10}$, secured to said rotary head or shaft $D^3$.

The means for operating the hook-former F by the rotation of the head $D^3$ has already been described.

The former F, which is carried by the horn G, is operated by the wedge $g$, as before described, by means of a sliding key $g^4$, mounted in a groove $g^5$ in the shaft G' of the horn G, and connected with the wedge $g$ by a projection $g^6$, fitting in a slot or hole in the wedge $g$, and connected to a sliding collar or sleeve $g^7$ by a projection $g^8$, fitting in an annular groove $g^9$ in said sleeve. The sleeve $g^7$ is reciprocated, as required, to move the wedge $g$ by means of a cam $g^{10}$ on the main driving-shaft R and a lever $g^{11}$, connected to said sleeve $g^7$. The horn G or its shaft G' is given its forward rotation to wrap the blank $x$ around the horn by means of cams $G^2$ $G^3$ on the main driving-shaft R through the bent lever $G^4$, pivoted at $G^5$ to the frame, connecting-link $G^6$, segment-gear $G^7$, and gear $G^8$ on the shaft G', and the horn is given its backward rotation, as before described, by means of cams $G^9$ $G^{10}$ on the main driving-shaft, pivoted guide-arm $G^{11}$, connecting-link $G^{12}$, lever $G^{13}$, connecting-link $G^{14}$, and crank-arm $G^{15}$, secured to the sleeve or collar $G^{16}$ on the shaft $G'$. The shaft $G'$ is alternately fixed to the sleeve $G^{16}$ and to the gear $G^8$ by means of a sliding key. We prefer to utilize for this purpose the same sliding key $g^4$ which is used to operate the wedge $g$, though a separate key may of course be employed.

The stop-blade H and guide-shoe $H^2$, which are carried by the pivoted arm $H'$, are operated by a cam $h'$ on the main driving-shaft R through the lever $h^2$, pivoted at $h^3$ to the frame and connected by a link $h^4$ to the movable arm $H'$.

The guide-shoe K, carried by the lever $K'$, is operated by a cam $k'$ on the main driving-shaft R.

The bumper or seam-squeezing device P is swung or rotated on its rock-shaft or pivot $p'$ by means of a cam $P^2$ on the main driving-shaft R, through a lever $P^3$ and connecting-link $P^4$, pivoted to the operating-arm $P'$, which is secured to the shaft $p'$. This cam $P^2$ and connecting mechanism are preferably simply used to throw the tooth or projection $p^2$ into and out of engagement with the recess $p^3$ in the horn, the rotation of the horn then serving to further rotate the squeezer P into the line joining the axes of the horn and shaft $p'$. A spring $P^5$ holds the operating-arm $P'$ in position for the tooth $p^2$ to engage the recess $p^3$ in the horn.

The blank pusher or feeder Q is operated by a cam $Q'$ on the main driving-shaft R. A spring $Q^2$, mounted on the middle or dividing rib or bar of the feed-chute E, serves to retract the feeder $Q^{11}$.

The can-body extractor T, or its slide $T'$, is operated by a cam $T^{20}$ on the main driving-shaft through the lever $T^3$, rock-shaft $T^4$, lever $T^5$, connecting-link $T^6$, lever $T^7$, and links $T^8$, which are pivoted to said slides T.

We do not claim as our joint invention the various operative devices and combinations thereof, as the same are the sole invention of said Peter Jordan, and form the subject of the sole application, Serial No. 304,237, filed of even date herewith. Our joint invention is confined to the improved mechanism we have devised for imparting to the several operative devices their proper movements in the required time, as herein set forth.

We claim—

1. The combination, with a backward and forward rotatable horn G and its shaft $G'$, of a loose gear $G^8$ on said shaft, a loose sleeve $G^{16}$ on said shaft, a sliding key $g^4$, adapted to alternately engage said gear and sleeve, and mechanism for moving the gear and sleeve in opposite directions, substantially as specified.

2. The combination, with a backward and forward rotatable horn and its shaft $G'$, of loose gear $G^8$, segment $G^7$, link $G^6$, bent lever-arm $G^4$, cams $G^2$ $G^3$, sliding key $g^4$, and mechanism for rotating said horn in both directions, substantially as specified.

3. The combination, with a backward and forward rotatable horn and its shaft $G'$, of loose gear $G^8$, segment $G^7$, link $G^6$, bent lever-arm $G^4$, cams $G^2$ $G^3$, sliding key $g^4$, loose sleeve $G^{16}$, having arm $G^{15}$, link $G^{14}$, lever $G^{13}$, pivoted arm $G^{11}$, connecting-link $G^{12}$, and cams $G^9$ $G^{10}$, substantially as described.

4. The combination, with the backward and forward rotatable horn G and its shaft $G'$, of the mechanism for giving the horn its backward movement, consisting of sliding key $g^4$, loose sleeve $G^{16}$, having arm $G^{15}$, cams $G^9$ $G^{10}$, pivoted arms $G^{11}$ $G^{13}$, link $G^{12}$ and link $G^{14}$, connecting said arms $G^{13}$ and $G^{15}$, and mechanism for rotating said horn in both directions, substantially as specified.

5. The combination, with rotatable horn G, carrying a pivotal former F, of a reciprocating wedge $g$, mounted in a slot or opening in the horn, sliding key $g^4$, and reciprocating sleeve $g^7$ for sliding said wedge and key, substantially as specified.

6. The combination, with rotatable horn G, carrying a pivotal former F, of a reciprocating wedge $g$, mounted in a slot or opening in the horn, sliding key $g^4$, reciprocating sleeve $g^7$ for sliding said wedge and key, cam $g^{10}$, lever $g^{11}$, and driving-shaft R, substantially as specified.

7. The combination, with a backward and forward rotatable horn G and its shaft $G'$, carrying a former and a sliding wedge for operating the same, of a reciprocating sleeve on said shaft $G'$ and means for connecting said sleeve and wedge, and mechanism for rotating said horn in both directions, substantially as described.

8. The combination, with a backward and forward rotatable horn G and its shaft $G'$, carrying a former and a sliding wedge for operating the same, of a reciprocating sleeve on said shaft $G'$ and means for connecting said sleeve and wedge, a loose gear and a loose sleeve on said shaft, a reciprocating key, and means for alternately driving said loose gear and loose sleeve in opposite directions, substantially as described.

9. The combination, with a backward and forward rotatable horn G and its shaft $G'$, carrying the former F, and a sliding wedge $g$ for operating the same, of a reciprocating sleeve $g^7$ on said shaft, a loose gear $G^8$ and a loose sleeve or collar $G^{16}$, and a reciprocating key $g^4$, connecting said sleeve $g^7$ and wedge $g$ and operating to alternately connect said gear $G^8$ and sleeve $G^{16}$ with said shaft, substantially as specified.

10. The combination, with a backward and forward rotatable horn G and its shaft $G'$, carrying the former F, and a sliding wedge $g$ for operating the same, of a reciprocating sleeve $g^7$ on said shaft, a loose gear $G^8$, a loose sleeve or collar $G^{16}$, a reciprocating key $g^4$, connecting said sleeve $g^7$ and wedge $g$ and operating to alternately connect said gear $G^8$ and sleeve $G^{16}$ with said shaft, and a cam and a lever for reciprocating said sleeve $g^7$, substantially as specified.

11. The combination, with a backward and forward rotatable horn G and its shaft G', carrying the former F, and a sliding wedge $g$ for operating the same, of a reciprocating sleeve $g^7$ on said shaft, a loose gear $G^8$, a loose sleeve or collar $G^{16}$, a reciprocating key $g^4$, connecting said sleeve $g^7$ and wedge $g$ and operating to alternately connect said gear $G^8$ and sleeve $G^{16}$ with said shaft, and a cam and lever for reciprocating said sleeve $g^7$, segment $G^7$, link $G^6$, bent lever $G^4$, and cams $G^2$ $G^3$, substantially as specified.

12. The combination, with a backward and forward rotatable horn G and its shaft G', carrying the former F, and a sliding wedge $g$ for operating the same, of a reciprocating sleeve $g^7$ on said shaft, a loose gear $G^8$, a loose sleeve or collar $G^{16}$, a reciprocating key $g^4$, connecting said sleeve $g^7$ and wedge $g$ and operating to alternately connect said gear $G^8$ and sleeve $G^{16}$ with said shaft, and a cam and lever for reciprocating said sleeve $g^7$, segment $G^7$, link $G^6$, bent lever $G^4$, and cams $G^2$ $G^3$, cams $G^9$ $G^{10}$, pivoted arms $G^{11}$ $G^{13}$, link $G^{12}$, link $G^{14}$, and arm $G^{15}$, secured to said sleeve $G^{16}$, substantially as specified.

13. The combination, with backward and forward rotatable horn G and its shaft G', of wedge $g$, sleeve $g^7$, having annular groove $g^9$, and reciprocating key $g^4$, having projections $g^6$ and $g^8$, and mechanism for rotating said horn in both directions, substantially as specified.

14. The combination, with backward and forward rotatable horn G and its shaft G', of wedge $g$, sleeve $g^7$, having annular groove $g^9$, and reciprocating key $g^4$, having projections $g^6$ and $g^8$, loose gear $G^8$, and loose sleeve $G^{16}$, substantially as specified.

15. The combination of rotatable horn G, its former F and die F', can-body-blank passage E, pusher Q, driving-shaft R, and cam Q', substantially as specified.

16. The combination of driving-shaft R, cam $C^2$, link $c^3$, arm $c^4$, rock-shaft $c^5$, having arms $c^6$, link $c^7$, and feeder-slide C', substantially as specified.

17. The combination of horn G with extractor T, its slide T', driving-shaft R, cam $T^{20}$, lever $T^3$, rock-shaft $T^4$, lever $T^5$, connecting link $T^6$, lever $T^7$, and connecting-link $T^8$, substantially as specified.

PETER JORDAN.
JOHN G. HODGSON.

Witnesses:
H. M. MUNDAY,
EDW. S. EVARTS.